US007823819B1

(12) United States Patent
Marshall

(10) Patent No.: US 7,823,819 B1

(45) Date of Patent: Nov. 2, 2010

(54) PILL CRUSHING DEVICE AND ITS ASSOCIATED METHOD OF OPERATION

(76) Inventor: Joyce Marshall, 3060 Bristol Rd., Apt. 177, Bensalem, PA (US) 19020

( * ) Notice: Subject to any disclaimer, the term of this patent is extended or adjusted under 35 U.S.C. 154(b) by 1100 days.

(21) Appl. No.: 10/869,786

(22) Filed: Jun. 17, 2004

(51) Int. Cl.
*A01D 34/90* (2006.01)
*A47J 42/00* (2006.01)

(52) U.S. Cl. ............................ 241/169.1; 241/DIG. 27

(58) Field of Classification Search ................. 241/169, 241/169.1, DIG. 17; 100/287, 288, 289, 100/345, 229 A, 295
See application file for complete search history.

(56) References Cited

U.S. PATENT DOCUMENTS

| | | | | |
|---|---|---|---|---|
| 2,602,596 | A * | 7/1952 | Jones et al. | 241/169.1 |
| 3,648,600 | A * | 3/1972 | Jaccard | 100/224 |
| 3,741,108 | A * | 6/1973 | Stratman et al. | 100/229 A |
| 3,822,638 | A * | 7/1974 | Merkin | 100/52 |
| 3,908,538 | A * | 9/1975 | Boyd | 100/49 |
| 4,007,678 | A * | 2/1977 | Gustavsson et al. | 100/52 |
| 4,212,430 | A * | 7/1980 | Dale et al. | 241/89.4 |
| 4,397,425 | A * | 8/1983 | Moore et al. | 241/169.1 |
| 4,570,536 | A * | 2/1986 | Dodd | 100/345 |
| 4,765,549 | A | 8/1988 | Sherman | 241/169 |
| 4,896,593 | A * | 1/1990 | Slusser | 100/345 |
| 5,067,666 | A * | 11/1991 | Sussman | 241/36 |
| 5,080,011 | A * | 1/1992 | Paxton et al. | 100/229 A |
| 5,322,227 | A * | 6/1994 | Fiocchi | 241/100 |
| 5,660,342 | A * | 8/1997 | Bock | 241/100 |
| 6,508,424 | B1 | 1/2003 | Marshall | 241/169.1 |
| 6,622,949 | B1 * | 9/2003 | Baswick et al. | 241/36 |
| 7,007,598 | B1 * | 3/2006 | Patras | 100/35 |
| 7,059,553 | B2 * | 6/2006 | Mueller | 241/199.12 |

* cited by examiner

*Primary Examiner*—Bena Miller
(74) *Attorney, Agent, or Firm*—LaMorte & Associates

(57) ABSTRACT

A pill crushing device and its associated method of operation. The pill container is comprised of a container and a lid assembly that covers the container. A pill to be crushed is placed inside the container and is automatically crushed using the power of a battery operated motor. A pill is introduced into the container through its open top end. A lid assembly is provided that is selectively attached over the open top end of the container. The lid assembly includes a ram that extends into the open top end of the container when the lid assembly is attached to the container. A battery operated motor is also provided in the lid assembly for raising and lowering the ram within said container. By attaching the lid assembly to the container and lowering the ram into the container, a pill can be crushed within the confines of the container.

15 Claims, 3 Drawing Sheets

PILL CRUSHING DEVICE AND ITS ASSOCIATED METHOD OF OPERATION

BACKGROUND OF THE INVENTION

1. Field of the Invention

The present invention relates to single-dose pill crushers and pill pulverizers that are used to crush large pills into smaller pieces. More particularly, the present invention relates to pill crushers and pulverizers that are motorized.

2. Description of the Related Art

Many medications, vitamins, nutritional supplements and the like come in the form of pills. Pills, however, come in a large variety of sizes. Some pills are so large that many people cannot comfortably swallow them whole. This is especially true for the very young, the very old and those with diseases of the throat or mouth.

If a person needs to take a pill and is unable or unwilling to swallow the pill, that pill must be broken into small pieces that can be swallowed or pulverized into a powder that can be mixed with food or drink. A pill can be crushed and/or pulverized by placing the pill in a pharmacist's mortar and pestle. However, very few people have access to a mortar and pestle. Furthermore, even if a person did have a mortar and pestle, such a bulky device could not be comfortably carried from place to place.

Many people who desire to crush a pill place the pill in a bag or folded piece of paper and then crush the pill by striking the pill with a hard object, such as the back of a spoon. Of course, such a crushing technique does work. However, the crushing of the pill is rarely uniform and some of the material of the pill is lost in the messy operation.

To help a person crush a pill, small handheld pill crushers have been developed. The prior art handheld pill crushers are typically cylindrical in shape and have two sections that join together with a threaded connection. A pill is placed in between the two sections and the two sections are screwed together. As the two sections of the pill crusher come together, the pill is compressed and crushed. Of course, the degree to which the pill is crushed is dependent upon how much manual force is applied to the pill crusher. Such prior art pill crushers are exemplified by U.S. Pat. No. 4,765,549 to Sherman, entitled Tablet Pulverizer.

As has been previously mentioned, pill crushers are commonly used by the very old and the infirm. Such people typically do not have a lot of arm and hand strength. Consequently, the ability of such people to use manually operated pill crushers is limited. To assist such persons, small motorized pill crushers have been developed. One such prior art pill crusher is disclosed in U.S. Pat. No. 6,508,424 to Marshall, entitled Battery Operated Pill Crusher. In this pill crusher, a container is provided that has a piston that rises and falls in the container under the power of a battery operated motor. A pill is placed in the container on top of the piston. A lid is then placed over the container and the piston is raised in the container. The pill is then crushed between the rising piston and the lid.

However, problems persist with motorized pill crushers. First, the moving piston is located below the pill being crushed. As such, dust from the crushed pill can become trapped between the interior walls of the container and the sides of the moving container. Thus, pill material is lost and pill material from one pill can contaminate the crushed material from a different pill that is crushed at a different time. Second, dust from the crushed pills can pass the piston and accumulate at the bottom of the container. Over time, the pill material can host bacteria and/or interfere with the motor workings of the pill crusher.

Lastly, handheld pill crushers have only limited space for batteries, thus small batteries are used. Small batteries cannot provide much power. As a consequence, the power available to the motor is limited. Using this limited power, the pill crusher may have to crush a hard pill. In prior art pill crushers, flat crushing surfaces are typically used. This disperses the crushed pill over a wide area and makes it hard for a small motor to generate the crushing pressure needed to fully pulverize a hard pill.

As such, a need therefore exists for a motorized pill crusher that does not harbor contaminants and is capable of fully pulverizing a hard pill using a limited electrical power source. This need is met by the present invention as it is described and claimed below.

SUMMARY OF THE INVENTION

The present invention is a pill crushing device and its associated method of operation. The pill container is comprised of a container and a lid assembly that covers the container. A pill to be crushed is placed inside the container and is automatically crushed using the power of a battery operated motor.

The container has an open top end and a closed bottom end. A pill is introduced into the container through its open top end. A lid assembly is provided that is selectively attached over the open top end of the container. The lid assembly includes a ram that extends into the open top end of the container when the lid assembly is attached to the container. A battery operated motor is also provided in the lid assembly for raising and lowering the ram within said container. By attaching the lid assembly to the container and lowering the ram into the container, a pill can be crushed within the confines of the container. Since the pill crusher is battery operated, it can be made small and highly portable. Yet, the ram is configured to provide sufficient crushing force to crush and pulverize even the hardest of pills.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention can be used to crush any compact powder tablet, such as a hard candy or a sugar cube, it is particularly well suited for crushing pharmaceutical pills. Accordingly, the present invention will be described in an application where it is being used to crush a pharmaceutical pill in order to set forth the best mode contemplated for the invention.

Figure 1:
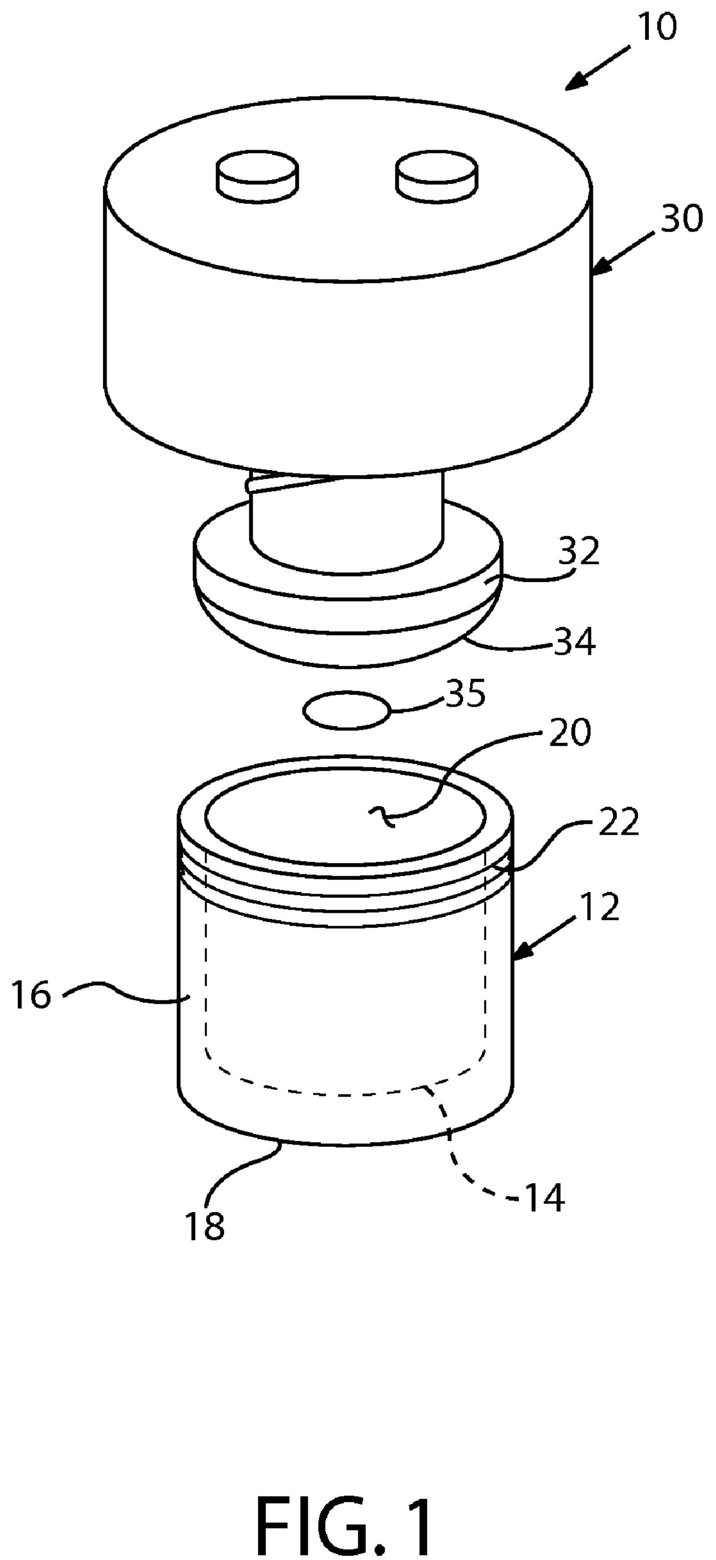
FIG. 1 is a perspective view of an exemplary embodiment of the present invention.

Referring to FIG. 1, an exemplary embodiment of a pill crusher 10 is shown. The pill crusher 10 is divided into two interconnecting sections that can be selectively attached and detached. The lower section of the pill crusher 10 is a container 12. The container 12 has a concave interior bottom surface 14 and a cylindrical wall 16 that extends upwardly from the periphery of the concave bottom surface 14. The concave bottom surface 14 and the cylindrical wall 16 are made from a hard, break resistant material.

On the exterior of the container 12 there is a flat base 18 that enables the container 12 to be self-standing on a flat surface. The container 12 has an open top end 20. Near the open top end 20 of the container 12 are disposed connector elements 22. In the shown embodiment, the connector elements 22 are threads. However, posts, wedges and the like can also be used in place of the threads.

A lid assembly 30 is provided that attaches to the container 12. Within the lid assembly 30 is a ram 32 that is used to mechanically crush pills. The lid assembly 30 attaches to the container 12 over the open top end 20 of the container 12. When the lid assembly 30 is attached, the ram 32 extends through the open top end 20 of the container 12. The ram 32 terminates at a grinding surface 34 that is convex in shape and complimentary to the concave shape of the bottom surface 14 inside the container 12.

As will later be explained in more detail, the grinding surface 34 of the ram 32 moves up and down. As the grinding surface 34 of the ram 32 moves up and down, it also rotates. A pill 35 is placed in the container 12, wherein the pill 35 lays in the center of the concave bottom surface 14 of the container 12. The grinding surface 34 of the ram 32 is then caused to move down to compress and grind against the pill 35. The pill 35 is crushed in between the concave bottom surface 14 and the convex grinding surface 34 of the ram 32, whereby the pill 35 is pulverized. Once the pill 35 is pulverized, the lid assembly 30 is removed and the crushed remnants of the pill 35 remain in the container 12. The ram 32 can then be wiped clean and can be used again without fear of contamination.

Figure 2:
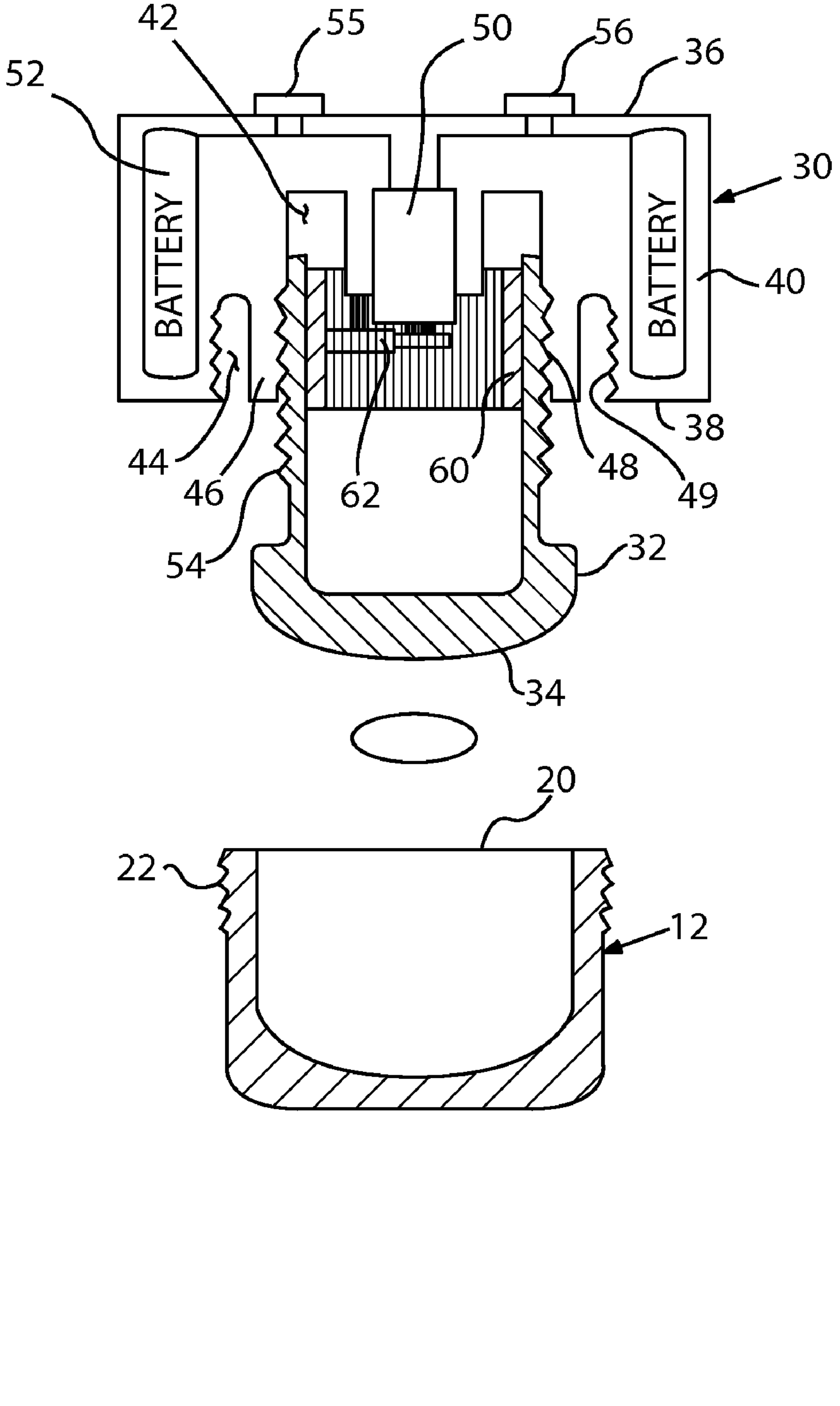
FIG. 2 is a cross-sectional view of the embodiment of FIG. 1.

Referring now to FIG. 2, the motorized workings of the ram 32 in the lid assembly 30 can be more clearly described. From FIG. 2, it can be seen that the lid assembly 30 has a primary housing 40 having a top surface 36 and a bottom surface 38. The primary housing 40 defines a central opening 42 that is opened to the bottom surface 38 of the primary housing 40. The ram 32 is disposed within this central opening 42, whereby the ram 32 selectively extends beyond the bottom surface 38 of the primary housing 40.

An annular grove 44 is disposed within the bottom surface 38 of the primary housing 40, wherein the annular groove 44 concentrically surrounds the central opening 42. A cylindrical wall 46 exists between the central opening 42 and the annular groove 44. The section of the cylindrical wall 46 that is exposed to the central opening 42 contains threads 48. As will be later explained, these threads 48 engage the ram 32 and enable the ram 32 to move up and down.

The interior surface of the primary housing 40 that is exposed by the annular grove 44 is also threaded. The threads 49 on this interior surface are sized and pitched to engage the threads 54 on the exterior of the container 12. It will therefore be understood that when the lid assembly 30 is placed onto the container 12, the open top end 20 of the container 12 passes into the annular groove 44. By rotating the lid assembly 30 or the container 12, the threads 49 in the primary housing 40 of the lid assembly 30 and the threads 22 on the exterior of the container 12 engage and interconnect the lid assembly 30 and the container 12.

A motor 50 and batteries 52 are held within the structure of the primary housing 40. The motor 50 is powered by the batteries 52 and is coupled to two control buttons 55, 56 that are present on the top surface 36 of the primary housing 40. One control button 55 enables the motor 50 to turn in a first direction. The second button 56 enables the motor 50 to turn in the opposite direction. It will be understood that a single, double pull control button can be used in place of the two separate control buttons 55, 56 shown. However, two separate control buttons 55, 56 are used in the exemplary embodiment for illustrative clarity.

The ram 32 is essentially a cylinder having a closed convex bottom end. However, the structure of the ram 32 changes along its length. At the bottom of the ram 32, the exterior of the grinding surface 34 is smooth. In this manner, no contaminants from crushed pills will be carried by this portion of the ram 32. Towards the middle of the ram 32 there is a threaded section. The threaded section contains threads 54 that engage the threads 48 on the interior surface of the primary housing 40 of the lid assembly 30. Accordingly, when the ram 32 is rotated relative the primary housing 40, the ram 32 will either descend from, or retract into, the central opening 42 in the primary housing 40.

Inside the ram 32, proximate its top, is located an internally geared spline section 60 with elongated gear teeth. The spline section 60 has a length, which is at least as long as the desired travel distance of the motorized ram 32. The spline section 60 can either be formed as part of the ram 32 or can be an insert that is attached to the interior of the ram 32.

The motor 50 rotates a gear train 62. The motor 50 and gear train 62 are supported by the primary housing 40 of the lid assembly 30. The gear train 62 engages the spline section 60 on the interior of the motorized ram 32. Consequently, when the motor 50 is activated, the motor 50 turns the gears in the gear train 62 and the gear train 62 causes the ram 32 to rotate. As the motorized ram 32 rotates, the threads 54 on the exterior of the ram 32 move past the threads 46 on the primary housing 40. The result is that the ram 32 either retracts upwardly into the primary housing 40 or descends downwardly from the primary housing 40 depending upon the direction that the ram 32 rotates. As the ram 32 ascends or descends, the spline section 60 moves with the ram 32 relative the gear train 62. However, the spline section 60 is at least as long as the travel distance of the ram 32. Consequently, the gear train 62 remains in contact with the spline section 60 throughout the range of movement of the ram 32.

Using the control buttons 55, 56 at the top of the lid assembly 30, a person can control the direction of rotation for the motor 50. Thus, by using the control buttons 55, 56, a person can make the ram 32 ascend or descend.

To utilize the present invention pill crusher 10, the lid assembly 30 is separated from the container 12. A pill 35 is then placed into the container 12. The lid assembly 30 is then placed onto the container 12 and is attached to the container 12. Once the lid assembly 30 is attached to the container 12, the control button 56 is pressed and the ram 32 is caused to descend into the container 12.

Figure 3:
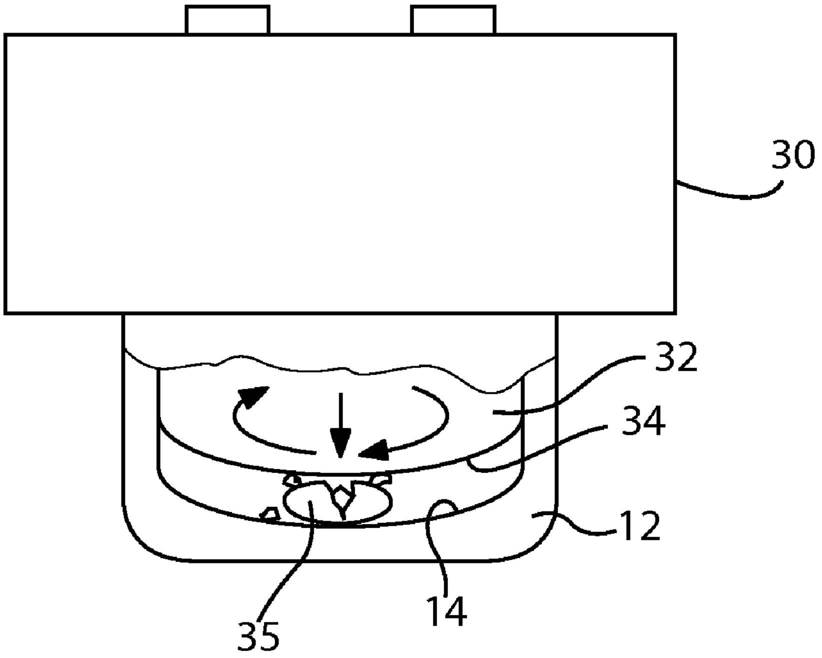
FIG. 3 is an enlarged cross-sectional view showing a pill being crushed by the embodiment of the present invention shown in FIG. 1 and FIG. 2.

Referring to FIG. 3, it can be seen that as the ram 32 descends, a pill 35 becomes compressed between the convex grinding surface 34 of the ram 32 and the concave bottom surface 14 of the container 12. The concave shape of the bottom surface 14 of the container 12 causes the pill 35 to rest in the center of the container 12. As the ram 32 touches the pill 35, the concave shape of the bottom surface 14 of the ram 32 causes only a small portion of the ram 32 to physically contact the pill 35 just before the pill is crushed. This concentrates the compression force into a very small area, thereby creating a large crushing pressure. Furthermore, the ram 32 is rotating as it contacts the pill 35. Thus, the ram 32 provides a concentrated crushing pressure combined with a grinding action that enables the ram 32 to break even the hardest of pills.

Once the pill 35 is broken and ground into the consistency wanted, the lid assembly 30 is removed. The crushed remnants of the pill 35 remain in the container 12. The crushed pill 35 can then be poured from the container 12 as needed.

Any remnants of the pill 35 that remain on the ram 32 can be easily wiped clean. The section of the ram 32 that actually contacts the pill 35 contains no grooves or other features that can harbor pill dust. Once the lid assembly 30 is removed and the ram 32 wiped clean, the ram 32 can be retracted and the pill crusher 10 is ready to be used again.

It will be understood that a person skilled in the art can make many variations to the exemplary embodiment of the present invention that has been illustrated. For example, many different interconnection configurations can be used to attach the lid assembly to the container. Furthermore, the shape of the lid assembly and the shape of the container can be altered to the whims of the manufacturer. All such variations, modifications and alternate embodiments are intended to be included within the scope of the present invention as defined by the claims.

What is claimed is:

1. A pill crushing device, comprising:
- a container having an open top end and a closed bottom end, wherein said closed bottom end has an interior bottom surface;
- connector elements disposed on an exterior of said container proximate said open top end;
- a lid assembly that selectively engage said connector elements on said exterior of said container, therein attaching said open top end of said container, said lid assembly including:
  - i. a ram that extends into said open top end of said container when said lid assembly is attached to said container;
  - ii. a motor for raising and lowering said ram within said container, wherein said motor simultaneously rotates said ram while raising and lowering said ram.

2. The device according to claim 1, further including controls on said lid assembly for selectively controlling said motor, therein controlling said raising and lowering of said ram.

3. The device according to claim 1, wherein said ram has a convex exterior bottom surface.

4. The device according to claim 3, wherein said interior bottom surface of said container is concave.

5. The device according to claim 1, wherein said lid assembly supports said motor in a stationary position.

6. The device according to claim 1, wherein said lid assembly further includes an internally geared spline section having elongated gear teeth.

7. The device according to claim 6, wherein said lid assembly further includes a gear train that interconnects said motor and said internally geared spline section.

8. A pill crushing device, comprising:
- a container having an open top end and a closed bottom end, wherein said closed bottom end has an interior bottom surface;
- a lid assembly that connects to said container over said open top end of said container;
- a battery operated motor disposed within said lid assembly; and
- a ram that extends from said lid assembly into said container, wherein said ram is both rotated and reciprocally moved up and down by said motor.

9. The device according to claim 8, wherein said interior bottom surface of said container is concave.

10. The device according to claim 8, wherein said ram has a convex exterior bottom surface.

11. The device according to claim 8, further including controls on said lid assembly for selectively controlling said motor, therein controlling said raising and lowering of said ram.

12. A pill crushing device, comprising:
- a container having an open top end and a closed bottom end, wherein said closed bottom end has an interior bottom surface;
- a lid assembly that connects to said container over said open top end of said container;
- a ram having a threaded exterior section that engages said lid assembly with a threaded interconnection, said ram terminating at a grinding surface within said container wherein said grinding surface reciprocally moves within said container when said ram is rotated within said threaded interconnection;
- a battery operated motor disposed within said lid assembly that rotates said ram when activated; and
- a control for selectively activating said motor.

13. The device according to claim 12, wherein said interior bottom surface of said container is concave.

14. The device according to claim 12, wherein said grinding surface of said bottom surface is convex.

15. The device according to claim 12, wherein said motor is selectively reversible.

* * * * *